United States Patent
Sliskovic et al.

(10) Patent No.: US 12,223,824 B2
(45) Date of Patent: Feb. 11, 2025

(54) METHOD FOR OPERATING A MOBILE SYSTEM AND AN ALARM GATEWAY AS SUBSCRIBERS IN A WIRELESS NETWORK

(71) Applicant: SEW-EURODRIVE GMBH & CO. KG, Bruchsal (DE)

(72) Inventors: Maja Sliskovic, Ettlingen (DE); Christian Sauer, Karlsdorf-Neuthard (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 261 days.

(21) Appl. No.: 17/627,344

(22) PCT Filed: Jun. 22, 2020

(86) PCT No.: PCT/EP2020/025295
§ 371 (c)(1),
(2) Date: Jan. 14, 2022

(87) PCT Pub. No.: WO2021/008721
PCT Pub. Date: Jan. 21, 2021

(65) Prior Publication Data
US 2022/0262232 A1  Aug. 18, 2022

(30) Foreign Application Priority Data
Jul. 15, 2019 (DE) .......................... 102019004894.6

(51) Int. Cl.
*G08B 27/00* (2006.01)
*G05B 19/418* (2006.01)
(Continued)

(52) U.S. Cl.
CPC ..... *G08B 27/006* (2013.01); *G05B 19/41895* (2013.01); *H04W 4/025* (2013.01); *H04W 4/90* (2018.02)

(58) Field of Classification Search
CPC . G08B 27/006; G05B 19/41895; H04W 4/90; H04W 4/025; G05D 2201/0216
(Continued)

(56) References Cited

U.S. PATENT DOCUMENTS

| 5,907,491 A | 5/1999 | Canada et al. |
| 10,278,053 B1 * | 4/2019 | Miller .................. H04W 16/18 |

(Continued)

FOREIGN PATENT DOCUMENTS

| CN | 107450401 A | 12/2017 |
| DE | 112016000264 T5 | 9/2017 |

(Continued)

OTHER PUBLICATIONS

International Report on Patentability issued in corresponding International Application No. PCT/EP2020/025295 dated Jan. 18, 2022, pp. 1-12, English Translation.

(Continued)

*Primary Examiner* — Maria El-Zoobi
(74) *Attorney, Agent, or Firm* — Carter, DeLuca & Farrell LLP

(57) ABSTRACT

In a method for operating an alarm system in a wireless network having at least one alarm gateway and at least one mobile system: a test message is generated by the alarm gateway; the test message is distributed in the network by the alarm gateway via broadcast flooding; the mobile system evaluates the incoming test messages; the mobile system generates a feedback message; the feedback message is sent through the network to the alarm gateway; and the alarm gateway receives the feedback message and evaluates it.

22 Claims, 14 Drawing Sheets

(51) Int. Cl.
*H04W 4/02* (2018.01)
*H04W 4/90* (2018.01)

(58) Field of Classification Search
USPC ..................................................... 455/404.1
See application file for complete search history.

(56) References Cited

U.S. PATENT DOCUMENTS

| | | | |
|---|---|---|---|
| 10,307,909 B1 | 6/2019 | Saboo | |
| 10,599,137 B2 | 3/2020 | Dai et al. | |
| 2005/0242944 A1* | 11/2005 | Bankert | G08B 27/001 340/539.1 |
| 2009/0037033 A1 | 2/2009 | Philips et al. | |
| 2009/0280741 A2 | 11/2009 | Krinsky | |
| 2010/0146057 A1* | 6/2010 | Abu-Hakima | H04L 67/563 380/282 |
| 2011/0159837 A1* | 6/2011 | Daly | H04H 20/59 455/404.1 |
| 2013/0268118 A1 | 10/2013 | Grinstead | |
| 2014/0201383 A1* | 7/2014 | Kuehnel | H04W 88/06 709/231 |
| 2017/0257602 A1 | 9/2017 | Axson et al. | |
| 2017/0285633 A1 | 10/2017 | Poornachandran | |
| 2017/0332218 A1* | 11/2017 | Du | H04W 4/029 |
| 2017/0351254 A1 | 12/2017 | Listwin et al. | |
| 2018/0004211 A1 | 1/2018 | Grimm et al. | |
| 2018/0017973 A1 | 1/2018 | Teague | |
| 2018/0132307 A1 | 5/2018 | Almeida Neves et al. | |
| 2018/0376357 A1 | 12/2018 | Tavares Coutinho et al. | |
| 2019/0049968 A1 | 2/2019 | Dean et al. | |
| 2019/0129444 A1 | 5/2019 | Wirth et al. | |
| 2019/0171208 A1 | 6/2019 | Magalhaes De Matos | |
| 2020/0014619 A1* | 1/2020 | Shelar | H04L 43/087 |

FOREIGN PATENT DOCUMENTS

| | | |
|---|---|---|
| JP | 2008017008 A | 1/2008 |
| WO | 2017093839 A1 | 6/2017 |
| WO | 2017205314 A1 | 11/2017 |
| WO | 2018108179 A1 | 6/2018 |

OTHER PUBLICATIONS

International Search Report issued in corresponding International Application No. PCT/EP2020/025295 dated Nov. 30, 2020, pp. 1-4, English Translation.
Office Action issued by the European Patent Office in corresponding EP Patent Application No. 20734832.7, dated Oct. 13, 2023, pp. 1-5.
Tseng, Y-C et al., "The Broadcast Storm Problem in a Mobile Ad Hoc Network" Wireless Networks (Mar. 2002) pp. 153-167, vol. 8.

* cited by examiner

METHOD FOR OPERATING A MOBILE SYSTEM AND AN ALARM GATEWAY AS SUBSCRIBERS IN A WIRELESS NETWORK

FIELD OF THE INVENTION

The present invention describes a method for operating a mobile system and an alarm gateway as subscribers in a wireless network.

BACKGROUND INFORMATION

For example, mobile systems can be robots or autonomous industrial trucks which move within a plant such as a warehouse or a production facility. Persons are normally also present inside such plants. For this reason, permanent safety zones are usually defined, such as escape or rescue routes that are reserved for persons and which mobile systems may use only briefly or only if the mobile systems can respond very quickly to the dangerous situation. It is also possible that other and/or additional zones are defined, e.g., areas that are at risk of explosions.

German Patent Document No. 11 2016 000 264 describes a safety system and a method for operating a safety control system.

U.S. Patent Application Publication No. 2018/0376357 describes a self-organized fleet of autonomous vehicles for optimizing 'the mobility of the future' and offers in cities.

U.S. Patent Application Publication No. 2019/0049968 describes a device and a method for a better autonomous operation of a motorized system.

U.S. Patent Application Publication No. 2018/0132307 describes a device and a method for use and control of a node in a network made up of moving things.

U.S. Patent Application Publication No. 2009/0037033 describes autonomous behaviors for a remote-controlled vehicle.

U.S. Pat. No. 10,307,909 describes a method for the selective uploading of operating data generated by a robot based on an attribute of a physical communications connection.

PCT Document No. WO 2017/205314 describes a method and a device for supplying a radio signal coverage.

U.S. Patent Application Publication No. 2017/0351254 describes a method for controlling an unmanned flying device.

U.S. Patent No. 2017/0285633 describes a method for the registration of remote controls.

U.S. Patent Application Publication No. 2013/0268118 describes a method for operating a robot.

U.S. Patent Application Publication No. 2019/0171208 describes a Cloud-based and collaborative method for machine learning for the optimization of the planning and operation of smart city installations.

U.S. Patent Application Publication No. 2018/0017973 describes a method for the navigation of a drone based on the connection quality of a WWAN radio link.

U.S. Patent Application Publication No. 2018/0004211 describes a device for autonomous vehicles for the selection and implementation of a route.

PCT Document No. WO 2017/093839 describes a flexible autonomous monitoring system.

U.S. Patent Application Publication No. 2017/0257602 describes a monitoring and control system.

SUMMARY

Example embodiments of the present invention provide a method for operating mobile systems in an operational environment in which the operating safety is improved.

According to example embodiments of the present invention, a method for operating a mobile system includes: detecting the current position of the mobile system within the zones; determining the connection quality of the mobile system in the wireless network; and adapting the behavior of the mobile system based on the detected connection quality and the ascertained position within the zones.

This offers the advantage that mobile systems in industrial environments are controlled under consideration of safety-critical zones and the current connection quality. The zones are fixedly defined for the plant and do not change during the operation. Examples of such zones are escape routes, fire protection zones, etc. The mobile systems have a connection to a wireless network via which they are able to receive control commands and alarm messages. Nevertheless, situations may arise in which not every mobile system has access to a network, for instance, because a wireless network signal is attenuated by obstacles. Then there is the risk, especially in alarm situations, that a mobile system does not receive an alarm message and thus perhaps will not vacate a danger zone or also endanger persons located there. For example, a mobile system therefore is able adapt its behavior to the current network connection quality and as a function of its position within the zones. Thus, a mobile system can autonomously adapt its behavior, possibly also without a network connection, and leave a critical zone, for example. This makes it possible to keep critical zones free, e.g., in alarm situations. The operational safety is improved as a result.

The connection quality may be defined by one or more network parameter(s), such as a signal propagation time, a received signal strength, a transmission rate, or a latency.

Moreover, example embodiments of the present invention provide the advantage of an improved utilization of the available area of the production facility while simultaneously providing better availability of escape routes or other safety-critical zones in the event of an alarm. For example, it may be specified that driving in these zones may take place if alarm notifications are able to be received with a small delay and a rapid response to safety-critical situations is thereby able to take place. To this end, the mobile system first detects the zone in which it is located. This may be accomplished both on the basis of previously performed mapping and on the basis of features of the environment.

Depending on the requirements, both the determination of the connection quality and the ascertainment of the position may take place periodically, regularly, and/or continually. It is important that current values for the connection quality and the position are available for an adaptation of the behavior. Therefore, the adaptation of the behavior may be a trigger for determining the connection quality and/or for ascertaining the position.

The network status of all mobile systems is monitored in parallel. Unique in this context is the flooding of the network with test messages, which are transmitted in the form of a broadcast. The subscribers are able to ascertain their own network status, e.g., by the number of received test messages, their delay, the used routes, and/or the sequence in which the test messages were received.

According to example embodiments, the determination of the connection quality includes the repeated receiving and evaluating of a test message, which is receivable as a broadcast in the network. This has the advantage that a test message reaches all subscribers within range.

According to example embodiments, the test message includes at least one unique identification, an unalterable counter, and an originator time stamp. The creator or originator of the test message, usually an alarm gateway, for example, incrementally increases the counter, and the counter is subsequently, i.e., during the forwarding, no longer changed. The test message may include further information pertaining to the originator of the test message such as a transmitter identification, a transmitter position, a transmitter status, and a transmission time.

In addition, the test message may have a check sum and/or a message type, for example. The message type, for instance, may be an alarm message, a test message, or a feedback message. Further message types are possible as well.

The message type may also include further information and/or conditions. In particular, the message type of an alarm message may be more complex. An alarm message, for instance, may define a temperature alarm that starts at a certain alarm temperature. The mobile system then locally measures the temperature and autonomously activates the alarm state, but only if the measured temperature exceeds or undershoots the set alarm temperature. In another example, the alarm may define the presence of a person in a certain zone or a sector. Mobile systems that are not driving in this zone or sector may therefore continue their travel in the normal manner. A more selective response to individual states can thereby occur so that, especially in large networks, all subscribers always do receive an alarm but not necessarily have to respond to it.

This has the advantage that the basic structure of the messages is always the same and the messages substantially differ merely by the value in the message type field. In this manner way, a transmission of an alarm message is given at the same probability or reliability as ascertained by the test messages, because transmission errors, e.g., bit errors, check sum errors or other errors, may be heavily dependent on the message length.

A check sum offers the advantage that it can be recognized whether errors have occurred in the transmission of the message, or in other words, that individual data in the message are possibly modified or incomplete.

According to example embodiments, the evaluation of the test message is accomplished in that the mobile system evaluates the delay, the transmission probability and/or the sequence of the received test messages and a redundancy of the routes via which the test messages were received. Such an evaluation may ultimately lead to a quantitative determination of the connection quality. This quantitative connection quality may be utilized as the basis for a behavior adaptation. The behavior may be adapted in a preventative and/or reactive manner.

According to example embodiments, the determination of the connection quality includes the transmission of a test message by the mobile system, especially the forwarding of a received test message, and multiple conditions apply to the transmission, in particular.

A delay of a test message, for instance, is able to be determined based on the difference between the receiving time and the originator time stamp of the message.

The number of received messages within a test period and the number of the expected messages, for example, is able to be used for ascertaining a packet error rate. In this context, for example, the value of the counter of the test messages which is unable to be changed during the forwarding, may be examined. If individual values of the continuous counter are missing, then they must have been lost along the transmission route.

A validity period, for instance, may be defined as a condition for a test message, the message not being forwarded if an ascertained delay is greater than the validity period. This prevents the distribution of outdated and invalid messages in the network so that the network utilization is reduced and the information content in the network increased. The fact that the test messages have an incremental counter makes it possible to determine whether one or more missing test message(s) lie(s) between two received test messages. A latency of the network, for instance, is thereby able to be ascertained. This has the advantage that the forwarding of messages by mobile systems makes it possible to extend the range within the network. Especially for the transmission of alarm messages, it is important to ensure an uninterrupted network coverage. This is possible without any significant installation investment. Depending on the size of the operational environment and the number of obstacles within the operational environment, e.g., shelves that interfere with the wireless network, a great number of stationary transmitter stations can be saved. Example embodiments of the present invention therefore provides for a wireless communication across large ranges without an infrastructure, which reduces costs and an installation outlay.

For instance, a forwarding condition may be that the current delay of a message is not too high, this message from the same transmitter has not yet been forwarded by the same transmitter, and/or the maximum number of forwarding events has not yet been reached. In these cases, the subscriber is able to transmit the message anew. This creates a network flood that significantly increases the range of the network test.

It is also considered advantageous to increase the range of the network test in that subscribers have the capability of forwarding the test messages. The forwarding of the test messages increases the effective range without requiring a stationary network infrastructure for this purpose. Every mobile and stationary subscriber can be provided with the forwarding capability so that a range extension is possible. This offers advantages both in terms of cost savings and more flexible application options of the mobile systems.

According to example embodiments, information pertaining to the mobile system, i.e., the forwarding subscriber, is added to the test message prior to the transmission. This information, for example, may include a subscriber address, a subscriber position, a subscriber state, and a forwarding time stamp. In addition, a forwarding counter of the test message is incrementable. For instance, this provides for a subscriber to determine whether it has already forwarded the same massage. In such a case, the forwarding may be stopped in order to prevent an unnecessary, redundant message flood.

Since possible alarm messages have the same structure as test messages, it is highly likely that the transmission of alarms is subject to the same delay as the measured delay of the test messages. Such a monitor-based prediction of deterministic transmission delays is unique. It offers the advantage that every subscriber is able to estimate how much time the receiving of an alarm message would require and of adapting its behavior accordingly.

Example embodiments of the present invention include an adaptation of the behavior of the mobile system based on the determined connection quality and the ascertained position within the zones.

According to example embodiments, the mobile system preventively refrains from driving in safety-critical zones if the determined connection quality is insufficient. In this manner, no mobile system with a poor connection quality will be located within a critical zone when an alarm message is triggered and the mobile system would not receive this alarm message because of its currently poor network connection.

According to example embodiments, the mobile system preventively leaves safety-critical zones if an insufficient connection quality has been determined. To this end, the mobile system may also increase its speed in order to leave the zone as quickly as possible. A mobile system may also save itself.

For instance, 'insufficient' may be defined as the quantitative connection quality not reaching a connection threshold value. Accordingly, a good or adequate connection quality may be described by the connection quality exceeding a connection threshold value, for example. In the adaptation of the behavior, a hysteresis may apply to the connection threshold value, which prevents an undefined transition state or a constant change in behavior.

According to example embodiments, when a good connection quality is determined, the normal operation continues if the mobile system is located in a non-critical zone. If the system is located in a critical zone, then the current task is continued. After this this task has been completed, a new evaluation may take place. If the connection quality is good, it is assumed that an alarm message to which a corresponding response may occur, e.g., a departure from a critical zone, can be received at all times.

According to example embodiments, the current task is ended if a poor connection quality is determined, and a search for a network access then takes place when the mobile system is located in a non-critical zone. If the mobile system is located in a critical zone, the critical zone will be left immediately and a search for a network access be carried out. This ensures that a critical region has already been left in an alarm situation or that a mobile system is already in the process of leaving a critical zone.

Example embodiments include feedback of the status of the mobile system in a feedback message to a central alarm gateway without the use of a network infrastructure. The feedback message includes at least a status of the mobile system. This provides the advantage that the alarm gateway is always informed about all subscribers in the network. For example, this makes it possible to ascertain the average and/or the longest propagation time at which messages reach all subscribers. The gateway may also carry out position monitoring and, for instance, adapt the frequency, i.e., the rate at which the test messages are sent, to the distances and/or the positions of the subscribers. The frequency is able to be increased if large distances or high speeds of the subscribers are involved or and/or during a stay in critical zones.

Conversely, the frequency may be lower if the mobile systems move slowly, are located in close proximity to the gateway, and/or are not located in critical zones.

For example, it is considered advantageous if the feedback message is transmitted as a broadcast or unicast message via a selected route. The feedback message reaches an alarm gateway without a fixed network infrastructure on a known route and thus with a known reliability.

To this end, the feedback message may include a list of addresses of the mobile systems of the selected route. This list includes the addresses of the forwarding mobile systems of the test message most recently received via the selected route, in reverse order. In this manner, the feedback message is returned to the alarm gateway on precisely this route. The transmission probability is therefore known.

The selected route may be the safest, the most reliable, or the fastest route. The selection can be fixedly predefined according to different criteria, e.g., depending on the application, or also dynamically by the mobile system as a function of parameters.

According to example embodiments, the method furthermore includes the following steps: receiving an alarm message that is available in the network in the form of a broadcast; forwarding the alarm message to the network as a broadcast; activating an alarm state of the mobile system based on the alarm message, the alarm state particularly being revoked only by an alarm acknowledgement; and adapting the behavior of the mobile system based on the alarm state.

In this manner, the distribution of an alarm within the network is possible in the same manner as the test messages.

For example, the adapting of the behavior may include leaving a critical zone or not driving in such a zone. Further information or parameters of the alarm message may also be taken into account in this context.

According to example embodiments, one or more wireless communication interface(s) of a mobile system is/are used for receiving and/or transmitting messages. This makes it possible to considerably increase the redundancy of possible routes for a message. It is possible that a message received at an interface is transmitted, i.e., forwarded, via one or more interface(s). The transmission interfaces may differ from the receiving interface. It is also possible that a mobile system receives messages via multiple interfaces but forwards them via only one interface. All M to N combinations of receiving and transmitting interfaces in-between are possible.

Via a wireless communications interface, the messages are transmitted in an electromagnetic, optical, acoustic, or an inductive manner, an electromagnetic transmission especially being carried out via WLAN or Bluetooth. Thus, wireless is not restricted to radio interfaces but may also refer to any contactless transmission.

According to example embodiments, the subdivision of the zones is implemented on the basis of previous mapping, for instance, with the aid of SLAM (Simultaneous Localization and Mapping) and/or on the basis of features in the environment. A mobile system may therefore map its operational environment on its own. However, it is also possible that a mobile system receives a map of its operational environment. This has the advantage that the subscriber itself is able to determine the operational zone in which it is presently located based on its position and thus can adapt its behavior on its own in accordance with the connection quality. It is important that the zones are fixedly defined with regard to the system and not modifiable. Thus, the zones are particularly independent of the mobile systems that are located and move within the plant. The primary task hereof is to keep certain zones within the system free rather than to protect persons within the direct radius of a mobile system, which is already accomplished by existing methods.

Another example includes a mobile system for operating as a subscriber in a wireless network having multiple subscribers. The mobile system has at least one wireless interface for receiving broadcast messages, the mobile system has device(s) for determining the position within an operational environment, the mobile system has device(s) for allocating the position to a zone, and the mobile system has a network evaluation unit for determining a connection quality and/or a network status.

The determined connection quality may be derived from various metrics and serve as the basis for a preventive and/or reactive behavior of the mobile system that also takes the current position within a zone into account.

It is therefore particularly suitable and/or adapted to carry out a method described herein for operating a mobile system.

According to example embodiments, the mobile system is adapted to transmit a broadcast message to the network in which a received broadcast message is forwarded, in particular. This allows the mobile system to forward a test message and/or an alarm message to further subscribers in the wireless network and thereby extend the range beyond the physically existing range.

In addition, example embodiments of the present invention provide to a method for operating an alarm gateway as a subscriber in a wireless network featuring a plurality of subscribers, which includes the repeated transmission of a test message to the network as a broadcast. This offers the advantage that each subscriber in the network is thereby able to ascertain its connection status by evaluating the test messages.

Example embodiments of the present method include receiving and evaluating of feedback messages of the further subscribers to the alarm gateway. In this manner, the alarm gateway is able to react to different situations, e.g., set up a detailed network topology, adapt the transmission frequency of the test messages, and/or transmit adapted control commands to subscribers.

According to example embodiments, the method includes the alarm gateway transmitting at least one alarm message instead of the test messages as a broadcast to the network. An alarm message thus propagates in the network in the same manner as a test message.

According to example embodiments, an alarm is able to be acknowledged, e.g., by a user, which causes the alarm gateway to be reset from the alarm state to the normal state and to resume the regular transmission of test messages.

Example embodiments of the present invention include receiving an alarm signal via an alarm interface and transmitting an alarm message as a broadcast to the network. In this manner, an alarm gateway is able to be connected to different alarm devices, e.g., via wired alarm interfaces. Such alarm devices, for instance, may be smoke detectors, fire detectors, motion detectors, moisture detectors, or other environment sensors. An alarm signal from one of these sensors is transmitted as an alarm message via a broadcast to the wireless network. In this manner, it is received and forwarded by mobile systems. This offers the advantage that even mobile systems located outside the physical range of the alarm gateway are able to receive the alarm message.

This is considered advantageous insofar as the alarm messages are distributed in the network in the same manner as the test messages and the propagation time of the messages, for instance, is known.

Alarm gateways may have a redundant configuration and be present as multiples in an application or in an operating environment. This makes it possible to compensate for a malfunction of an alarm gateway. For practical purposes, however, the test messages and alarm messages are transmitted by only a single alarm gateway in each case so that unnecessary network traffic is reduced. The alarm gateway may nevertheless be connected to multiple transmission devices by which a test and/or alarm message is/are transmitted simultaneously. This makes it possible to increase the initial range and/or redundancy of the routes.

One example includes an alarm gateway as a stationary system in a wireless network featuring multiple subscribers. The alarm gateway at least one wireless communications interface for transmitting broadcast messages to the network, and the alarm gateway has at least one alarm interface for connecting to an alarm device.

This offers the advantage that alarm signals received via the alarm interface are able to be sent to all subscribers in the network in a rapid manner and with a deterministic delay.

According to example embodiments, the alarm gateway includes device(s) for evaluating the network status, e.g., feedback messages of the subscribers. These device(s) may be situated in the alarm gateway or in a device connected to the alarm gateway. This offers the advantage that a network topology can be set up and that the status, position and other parameters of all subscribers may be known.

Example embodiments of the present invention include the control of mobile systems in an industrial environment while taking safety-critical zones and the current network status into account. This includes the detection of different operational zones in the industrial environment, the determination of the zones on the basis of prior mapping, e.g., with the aid of SLAM (Simultaneous Localization and Mapping), and/or the detection of the zone on the basis of features in the environment.

In addition, example embodiments of the present invention include permanent monitoring of the network status of all subscribers in a multi-hop network without an infrastructure. For example, this may be accomplished by monitoring with the aid of a flood of test messages via a broadcast and by forwarding of the test messages by the subscribers for a greater range without a network infrastructure. Conditions for the forwarding are able to keep the flood free of loops and restrict the distribution and spare network resources.

The subscribers detect the connection quality by evaluating the delay, the transmission probability, the sequence of the received test messages, and the redundancy of the routes via which the test messages are received. For instance, the delay can be ascertained in that each test message includes the transmission instant. The current delay of the message results from the difference between the current time when the message is received and the transmission instant. The system times of all subscribers may be synchronized for this purpose. This can be accomplished with the aid of software protocols such as NTP or PTP, for instance, or with the aid of hardware, such as real time clocks or GPS time sources.

To ascertain the sequence of the received test messages, each message includes a counter. This counter is continuously incremented by the transmitter of the test messages. The absence of a counter or the receiving of an outdated counter points to an incorrect receiving sequence. The percentage of transmitted test messages is calculated across a certain time period. This produces the transmission probability as a ratio of the received to the expected messages.

With the aid of the counter, it is also possible to detect test messages that are received twice or multiple times. Since each message includes the information indicating which subscribers have already forwarded the test message, the route of each received message is known. If a message is transmitted via at least two routes on which no identical subscribers are located, these routes are redundant. Redundant routes are desirable for increasing the transmission reliability. By checking for redundant routes, a malfunction of the alarm transmission in a case where only a single subscriber is malfunctioning can be excluded.

Moreover, the behavior of a subscriber is able to be adapted depending on the combination of a connection quality and current zone. If a good connection exists in a non-critical zone, the normal operation may be resumed. If no connection exists in a non-critical zone, the current task may be finished and a search may be undertaken for a network access. If a good connection exists in a critical zone, the task may be resumed. If no connection is available in a critical zone, this zone must be left immediately and a search undertaken for a network access.

As previously mentioned, the connection quality may be described by quantifying it by one or more network parameter(s). For instance, the receive signal strength, the propagation time, and/or the latency may be taken into account in the process. A good or sufficient connection quality consequently exists if the quantitative representation of the network parameters exceeds a predefined connection threshold value. The connection threshold value may be fixedly predefined or be dependent upon further environment parameters, such as the distance to the next subscriber or the speed of the subscriber.

Example embodiments of the present invention also include a preventive non-travel of safety-critical zones if the connection quality is insufficient. The connection quality is preventively detected through permanent network monitoring. Safety-critical zones are not entered if no sufficient connection quality is available. Critical movements of the network subscribers that could lead to a connection loss are able to be identified in a timely manner. Forwarded messages include information of the forwarding network subscribers and, among others, also include the position and speed. Very large distances or rapidly increasing distances in the network are detectable early enough. Greater distances mean lower transmission probabilities in most environments.

Because of the previously mentioned features, a transmission of alarm messages at a deterministic delay is possible in a multi-hop network without the need of a network infrastructure. Since these messages are transmitted along the same route in the network as the test messages, the manner in which path such alarm messages are going to propagate within the network is known at all times. For this reason, the test channel for the connection quality is used for alarm messages that are transmittable with a deterministic delay to all connected network subscribers. Alarm messages may correspond to the test messages in terms of their length and structure so that it is highly likely that the previously determined transmission delay will remain. Because of the constant network checks, a subscriber is able to predict the delay of an alarm transmission with a very high probability.

Example embodiments of the present invention include feedback of the status of the user terminals to a central instance without the use of network infrastructure. This means that the data transmitted for a network test are used for supplying feedback to the central system. Because of the flood of test messages, a tree-like topology is produced which is utilized for the return transmission of the feedback messages. The most reliable route may be selected for the return transmission. In example embodiments, however, it is also possible to use redundant routes for the transmission.

In this context, data such as transmission probabilities, achieved delays, e.g., the average and the longest delay, and/or the most reliable route of the connection are, for example, transmitted in return. In addition, a single item of information or multiple of the following optional items of information is/are transmittable: the number of direct neighbors of a subscriber; the position, the battery status and/or the task being carried out just then. This has the advantage that the central system, such as an alarm gateway, is always informed about all subscribers and is therefore able to distribute and adapt control commands and tasks to the subscribers.

For example, the mobile system may be arranged as a separate unit which is connectable to an existing mobile system. For example, an existing or available robot is thereby able to be equipped with the new functionality. However, the mobile system may also already be a robot in which the features described herein are integrated at the factory.

For example, the alarm gateway may be arranged as a separate unit that is connectable to an existing alarm gateway. For example, this makes it possible to equip an existing or available alarm gateway with the new functionality. However, the alarm gateway may also already have the features described herein when leaving the factory.

Further features and aspects of example embodiments of the present invention are described in greater detail with reference to the appended schematic Figures.

DETAILED DESCRIPTION

Figure 1:
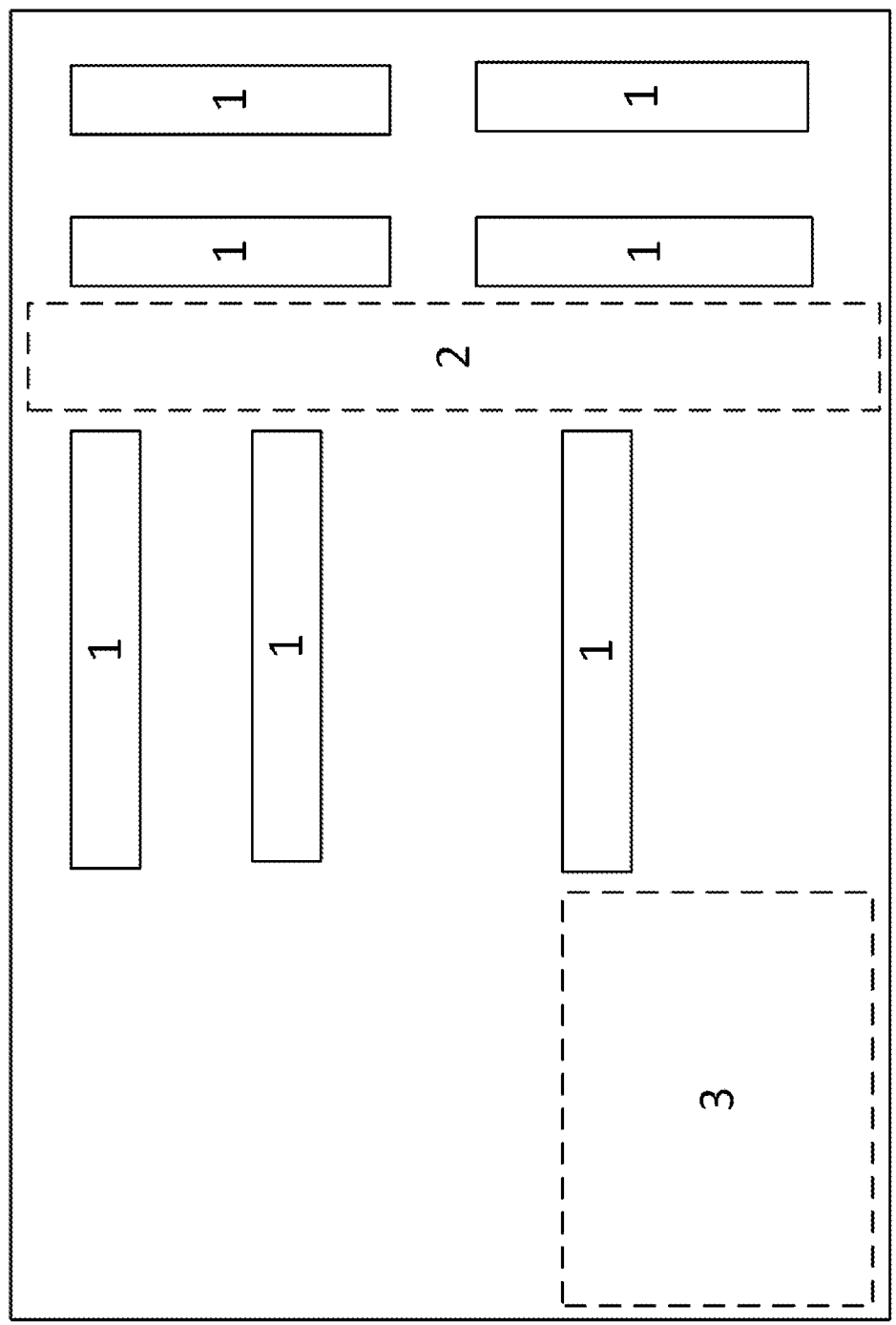
FIG. 1 schematically illustrates an operational environment featuring different zones.

FIG. 1 schematically illustrates an exemplary operational environment of a mobile system, such as a robot. The operational environment may be a warehouse or a production plant and is subdivided into different zones. The zones are fixedly defined with regard to the operational environment and are usually not dynamic. These zones also include obstacles, which are denoted by reference numeral 1. For example, these may be machines, shelves, or other static and/or dynamic elements. These obstacles 1 restrict the possible movements of the mobile systems within the operational environment and also affect the wireless data transmission.

There are different zones 2 and 3 in the operating environment that are taken into account during the working process of the mobile systems, e.g., escape routes for persons, rescue paths, certain driving paths, explosion-protected areas, fire protection zones, etc. As illustrated in FIG. 1, zone 2 represents an escape route, and zone 3 is a region in which an explosion risk exists. These zones are therefore critical zones. The operational environment not allotted to one of these zones is the non-critical zone inside which a mobile system is able to move without restriction.

Figure 2:
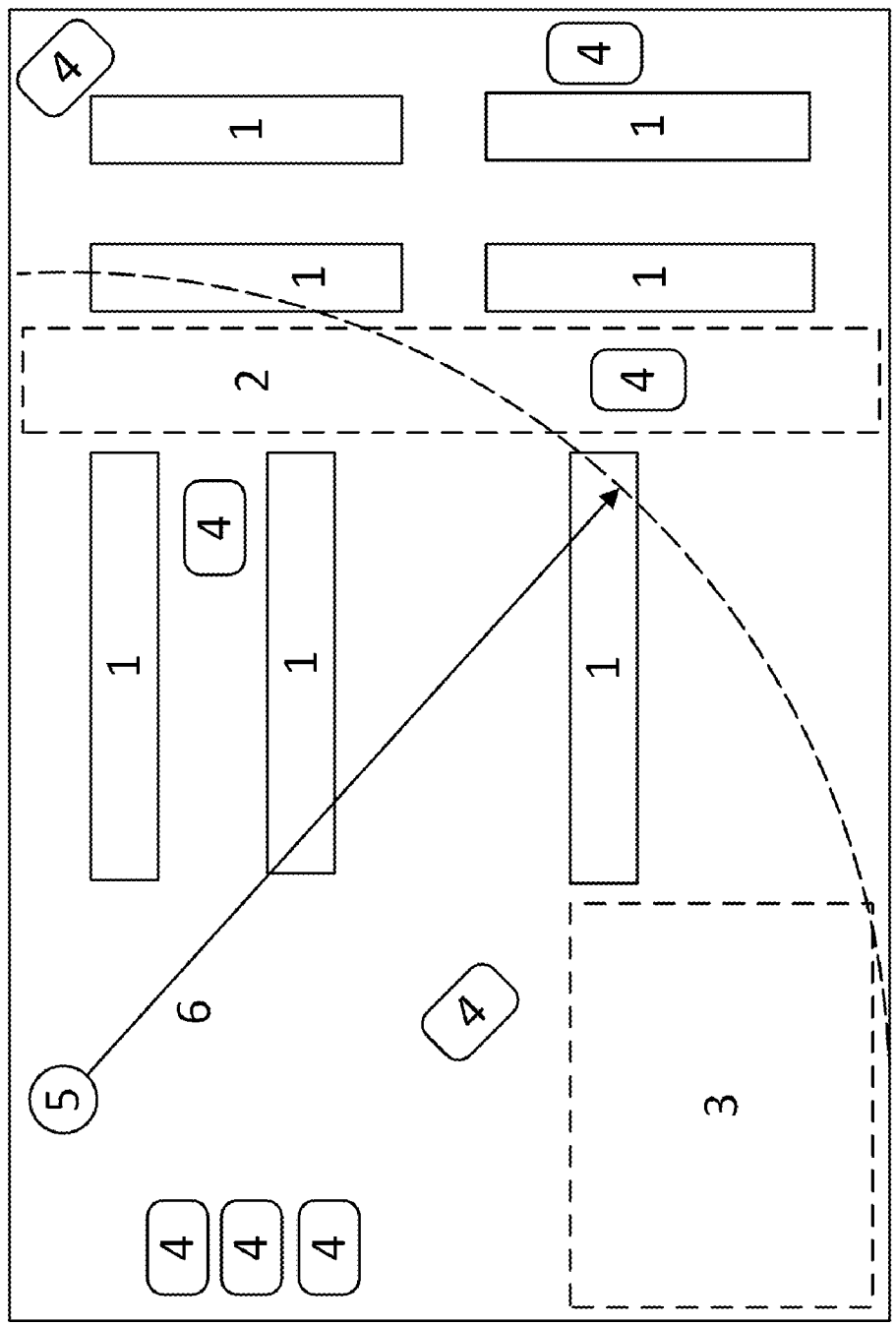
FIG. 2 schematically illustrates the operational environment illustrated in FIG. 1 with a stationary alarm gateway and a plurality of mobile systems.

In the operational environment illustrated in FIG. 2, for example, a group of mobile systems 4 and a static system 5 are operating. This group is heavily heterogeneous. The single commonality of all involved systems 4 and 5 is that they are adapted to perform functions described herein, such as the availability of a wireless communications interface.

Stationary system 5 is arranged as an alarm gateway in this instance, which is the source of test and alarm messages for the subscribers. All mobile subscribers 4 and alarm gateway 5 form an alarm system 7 in the context of the functionality described herein. A characteristic of alarm system 7 is that alarm messages can reach every subscriber 4 and that each subscriber responds appropriately to alarm messages.

Alarm gateway 5 has alarm interfaces with peripheral monitoring units, which allow for the receiving of information, e.g., fire detection systems, temperature monitors, and further sensors and monitoring systems. Alarm gateway 5 is equipped with one or more of these monitoring unit(s). Possible configurations of these monitoring units include a connecting network elements, central control units, or also emergency power-off buttons featuring a wireless communications interface.

Mobile systems 4 have a processing unit that includes a program by which the method described herein is implemented so that they are able to react to the combination of current location within the operational environment, i.e., the zone in which the mobile system is located, and incoming alarm messages. As far as the operational environment illustrated in FIG. 2 is concerned, this means, for example, that travel within zone 2 is no longer allowed if the temperature has risen. Or, in the event of a fire alarm, all autonomous mobile systems 4 must leave critical zone 2 without delay in order to vacate the escape route or keep it free for a possible evacuation of persons. The mobile systems, for example, may also increase their speed for that purpose in order to leave the critical zone as quickly as possible.

FIG. 2 additionally illustrates the physical transmission range 6 of alarm gateway 5. All mobile systems 4 located within this range 6 are able to receive alarm messages with a slight delay and with great reliability directly from alarm gateway 5. The system provides for mobile systems 4 to continually monitor this link to the alarm gateway and to respond to unreliable and slow connections. In addition, the range for alarm messages is able to be extended by mobile systems 4. Alarm messages are thereby receivable beyond the initial physical range of alarm gateway 5.

Figure 3:
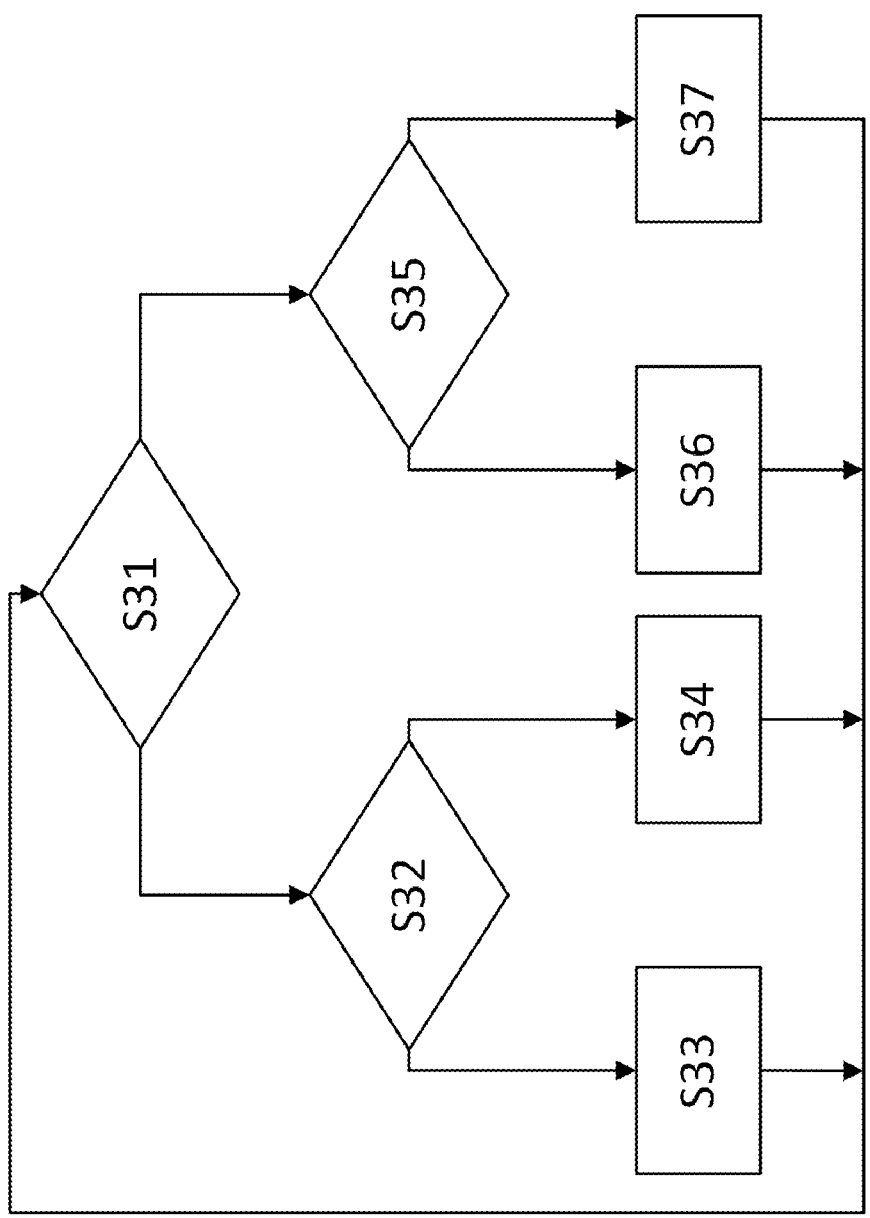
FIG. 3 is a schematic flow diagram of a reactive behavior of a mobile system.

FIG. 3 is a flow diagram of an exemplary reactive behavior of mobile system 4 based on its current zone and its network connection quality using the example of a fire alarm transmission.

In a first step S31, it is determined whether the current network connection, i.e., the connection quality, is good. A good connection quality may be characterized in that, for instance, a quantitative representation of one or more network parameter(s) exceeds a connection threshold value.

If the connection quality is good, then it is checked in a next step S32 whether the mobile system is located inside a critical zone, such as an escape route 2 in the example.

If no, then the current task of the mobile system continues to be carried out in step S33.

If yes, then the current task is likewise continued in step S34. However, escape route 2 is left if this does not hamper the task, worsens the connection quality or if the task is concluded.

If the connection quality is poor, i.e., insufficient, then it is also checked in a next step S35 whether the mobile system is located inside a critical zone such as on an escape route 2, for. A poor connection quality, for example, may be characterized in that a quantitative representation of one or more network parameter(s) undershoots the connection threshold value.

If yes, then escape route 2, i.e., the critical zone, is left immediately in next step S36, and a search for access to the network is undertaken. An access to the network is obtained by heading for a position in the operational environment that offers a satisfactory connection quality.

If no, then the current task is continued in next step S37 and followed by a search for access to the network.

In any event, the method continues with step S31. The determination of the connection quality in the example is an activity that is permanently repeated because the behavior of the mobile systems depends on it.

Figure 4:
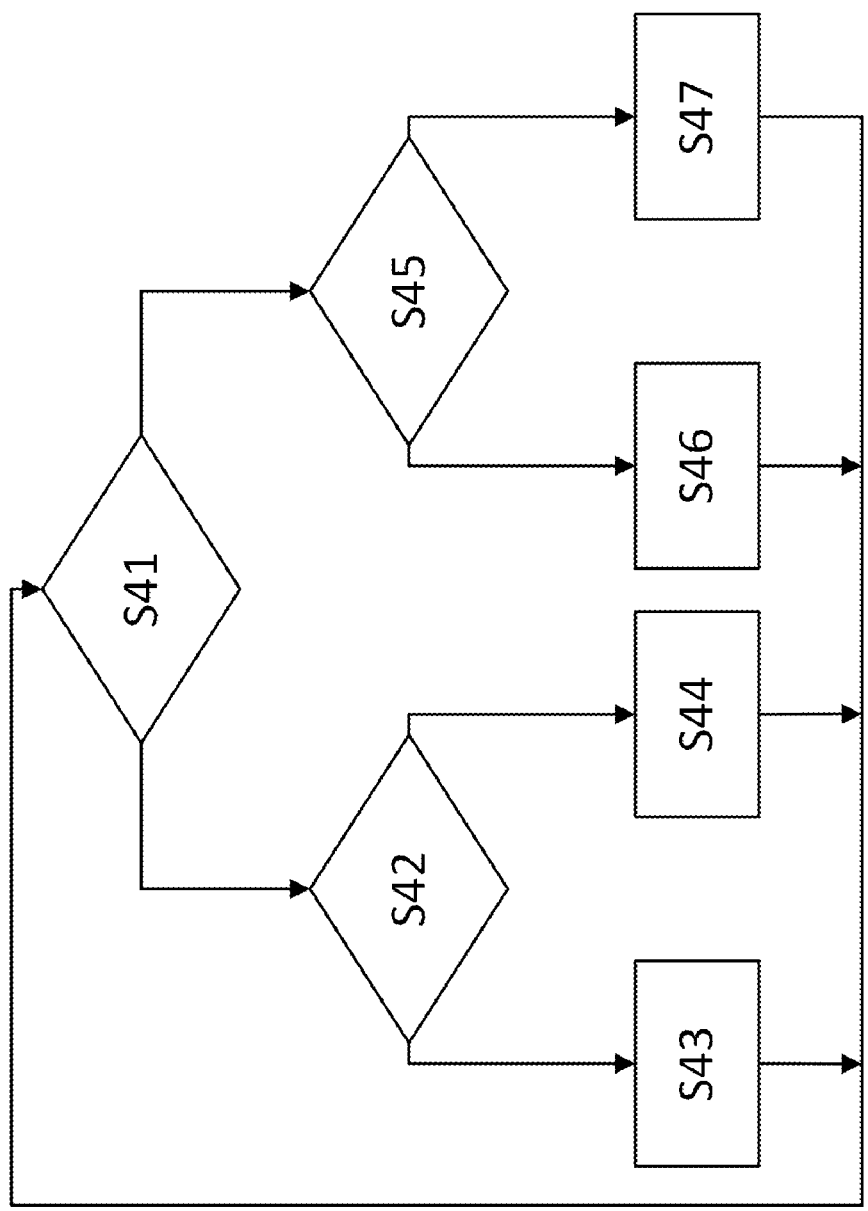
FIG. 4 is a schematic flow diagram of a preventive behavior of a mobile system.

FIG. 4 is a flow diagram of an exemplary preventive behavior of a mobile system 4. In this instance, mobile system 4 checks in a first step S41 whether driving in a critical zone 2, 3 is to take place. This is accomplished by comparing the current position with the zones of the operational environment.

If yes, then it is first checked in a further step S42 whether the connection quality of the network is good.

If yes, then the current task is continued in a step S43. Driving within the critical zone may be undertaken. In an alternative arrangement, the speed of the system, for instance, may be reduced in step S43 as a function of the type of zone and the mobile system.

If no, no driving may take place in the critical zone. The mobile system stops, or it may search for an alternative route while circumventing the critical zone. In addition, the current network status is reported to alarm gateway 5. In an alternative arrangement of the system, a further mobile system 4 may be requested from the central control in order to ensure a reliable connection to the network. The requested subscriber, for instance, may position itself between alarm gateway 5 and the requesting subscriber and thereby serve as a range extension.

Even if no driving is going to take place in a critical zone, it is checked in a further step S45 whether the connection quality of the network is good.

If yes, then the current task is continued in step S46. If not, the task will be continued nevertheless, but a connection to the network is established, if possible.

The manner in which the mobile system behaves as a function of the network status and location is adaptable to the individual situation. In addition to the behaviors described with reference to FIGS. 3 and 4, many further scenarios and procedures are possible. The behavior may also depend on the type of critical zone and/or the type of the current situation in the operational environment, e.g., the time of day, the ambient temperature, the number of persons, etc.

The periodicity or frequency at which the location and the network status are checked may, for example, be adapted to the dynamics of the examined network and typically ranges from Hz to kHz. If the network subscribers move quickly, a more frequent check may be carried out than in the case of slow subscribers. At a speed of 1 m/s of the mobile systems, for instance, a frequency of at least 1/s is considered beneficial. The frequency may be fixedly predefined or can also be dynamically adapted to changing speeds of the subscribers.

In order to provide permanent monitoring of the network, the alarm gateway sends out test messages at regular intervals in a normal case. These test messages are received by the user terminals and the delay during the transmission is ascertained. Since the test messages are identical to the alarm messages in terms of their size and modulation, a subsequently transmitted alarm message will most likely exhibit an identical transmission behavior. The network status is ascertained via the test messages and regularly forwarded to the control of the mobile systems. Alarm messages are transmitted via the same interfaces as the test messages but may also be transmitted with a low delay regardless of their periodicity.

Figure 5:
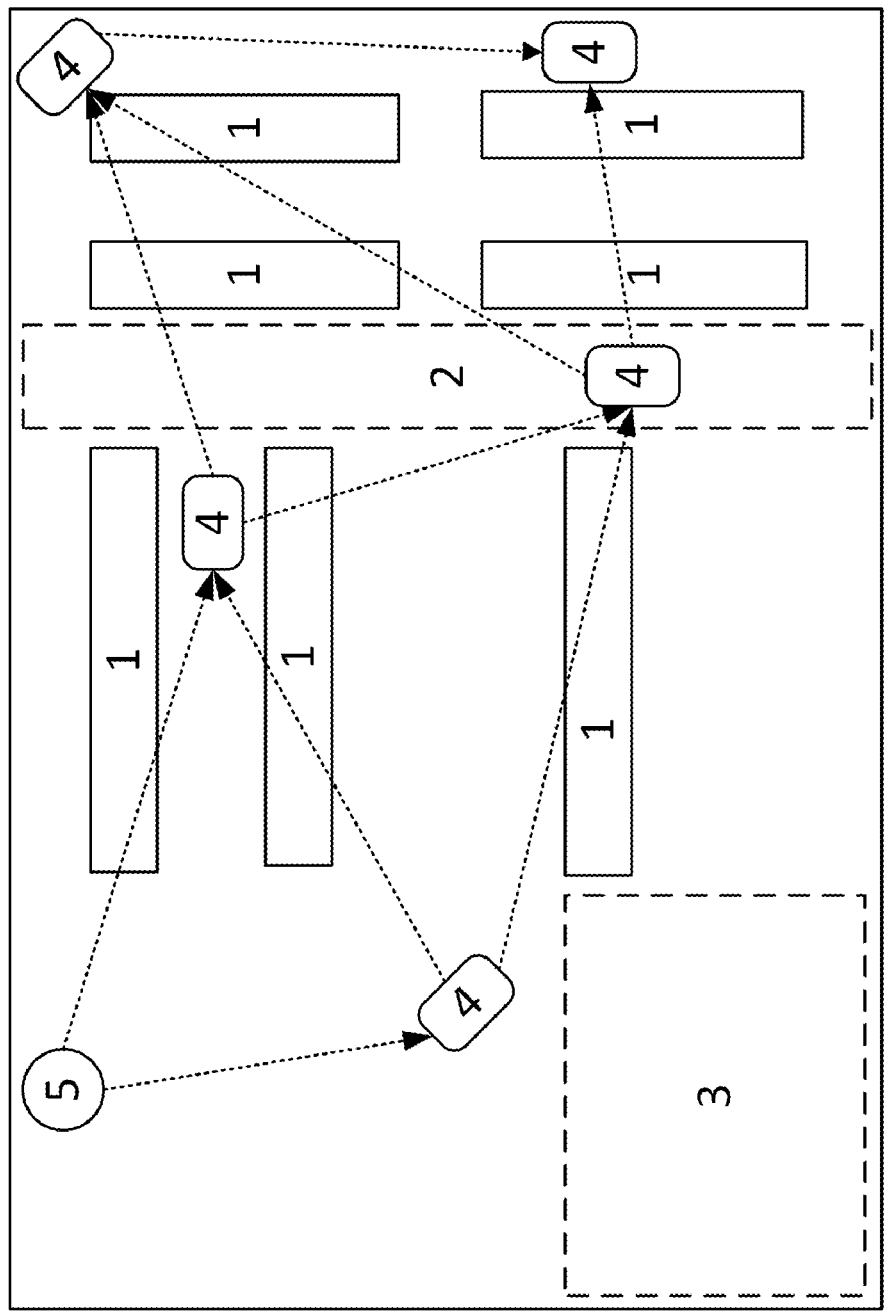
FIG. 5 schematically illustrates the operational environment illustrated in FIG. 1 to illustrate the forwarding of messages in the wireless network.

FIG. 5 illustrates an alarm system 7 based on the operational environment of FIG. 2. Alarm system 7 includes alarm gateway 5 as a stationary subscriber as well as a plurality of user terminals as mobile subscribers 4. Alarm system 7 is furthermore formed and defined by the interaction between mobile subscribers 4 and alarm gateway 5.

Alarm system 7 is independent of a network infrastructure. For this reason, alarm gateway 5 emits the test and alarm messages 10 as a broadcast via all available communications interfaces. This makes it possible to transmit these messages 10 also without an infrastructure. Each user terminal 4 receiving this alarm or test message evaluates it, adds information about itself and forwards it again as an infrastructure-independent broadcast. In the created flood of alarm or test messages, measures are taken to limit the load for the wireless network. The network is kept loop-free in that outdated messages are no longer transmitted.

Since information including the addresses of the forwarding mobile systems are added to forwarded messages, each user terminal receiving a message knows a route back to the alarm gateway. The user terminal transmits information about its current state back to the alarm gateway via such a route. This may include information about the network status, the position of the user terminal and/or its remaining battery capacity. As a result, the alarm system makes it possible not only to transmit alarms with a minimal, deterministic delay, but also to monitor the most important information of all connected user terminals in a manner that is independent of an infrastructure. To spare network resources, the feedback of the status information is, for example, carried out at a lower frequency than the transmission of the test messages.

Alarm system 7 makes only minimal demands on the type of implementation of its elements. FIGS. 6(a) to 6(c) illustrate three variants for alarm gateway 5. In all variants, alarm signals are received by an external alarm interface 8. Such alarm signals, for example, may be triggered by external sensors, such as smoke detectors or humidity detectors.

Figure 6:
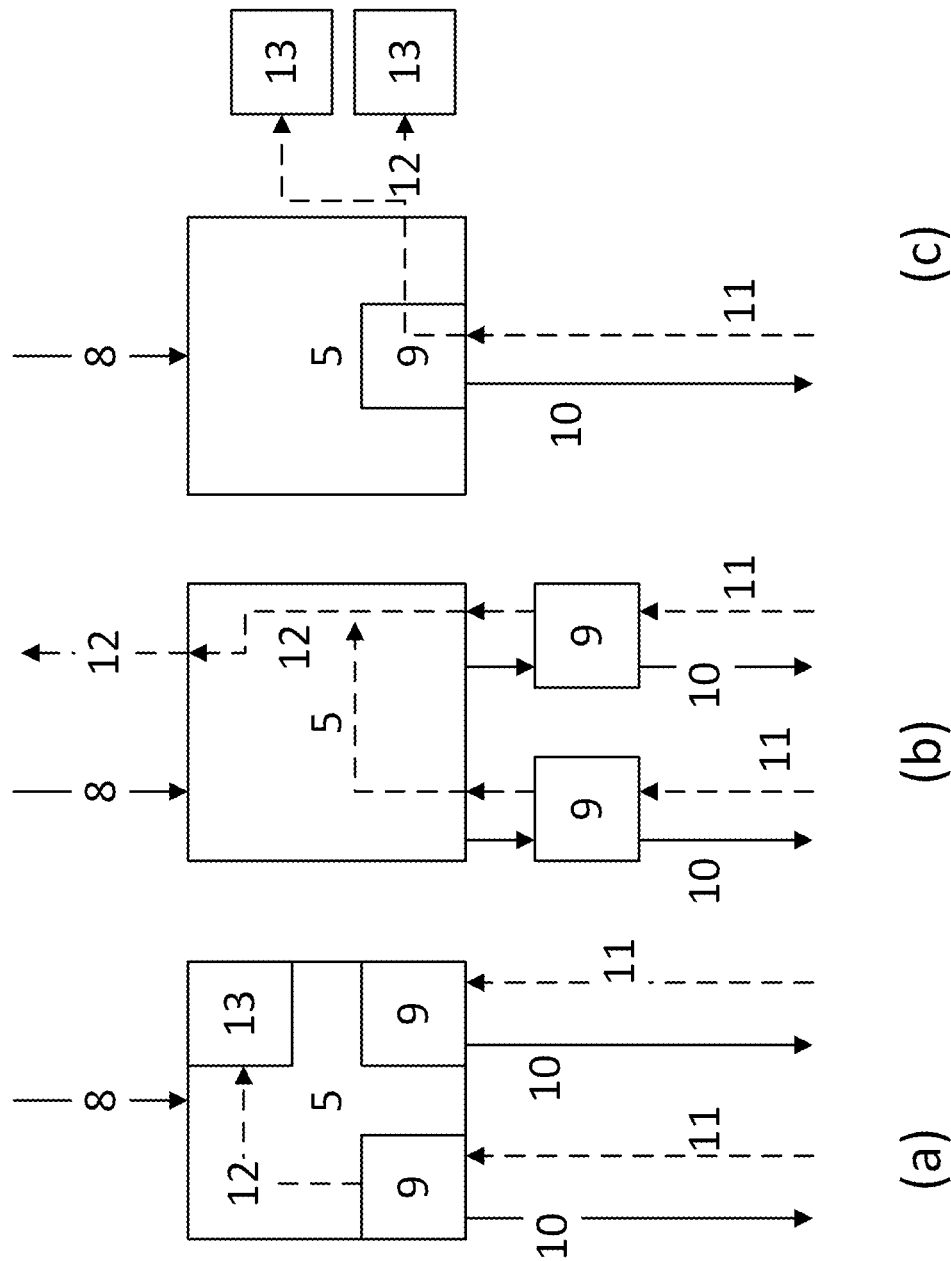
FIGS. 6(a), 6(b), and 6(c) schematically illustrate different embodiments of an alarm gateway.

Like the test messages generated by gateway 5, these alarm signals are conveyed to communications interfaces 9 which transmit them as alarm messages in the form of a broadcast 10 to the other subscribers of the network. Gateway 5 has one or more communications interface(s) 9 as illustrated in FIGS. 6(a) to 6(c). These interfaces 9 are either internal components (see, FIGS. 6(a) and 6(c)) of the gateway or external elements (see, FIG. 6(b)). Feedback messages 11 from the network are received by one or more of interface(s) 9 and forwarded to elements 13, which evaluate the current status of the network. This may be both software components 13 on gateway 5 itself (see, FIG. 6(a)) and/or parts of external devices 13 (see, FIG. 6(c)). It is also possible that the evaluating elements 13 are identical with the peripheral components which generate the alarm signals (see, FIG. 6 (b)).

The integration of alarm system 7 into mobile user terminals 4 is also flexible. The system is able to be integrated into existing mobile systems 4 as additional hardware and/or software. It may be equipped with independent communications interfaces 9 or also use existing interfaces 9 of the user terminal. Alarm system 7 is connected to different internal components of the user terminal in order to inform them of the current network status and to obtain information for generating the feedback messages. However, the alarm system may also be integrated in mobile user terminal 4 at the factory.

In addition to the described alarm gateways 5 and user terminals 4, however, further components are also possible in alarm system 7. These include, for example, stationary elements for forwarding alarm and test messages, stationary alarm generators, e.g., emergency shut-off switches, which also send locally limited alarms to the network, with or without a prior network test.

The following sections describe the entire sequence within the network. To begin with, the normal operation during the network monitoring phase will be described.

The alarm system has at least one interface, both on the alarm gateway and on each user terminal, via which the data are exchanged via the user terminal. These include, for example, at least the following data: a unique address such as an IP address or a MAC address, the current location of the device, the current status of the device, e.g., its current task or the battery state, and a clock time that is synchronized systemwide.

In addition to this information, configurations that describe the linkage of the communications interfaces and further general information about the structure and the function of the user terminal are transferred at the time of the alarm system initialization. This information is available to the local instances of the alarm system and used for the further function of the alarm system. The synchronization of the system times of a plurality of subscribers is implemented via protocols such as NTP. A synchronization is performed with respect to a local time server, for example.

Figure 7:
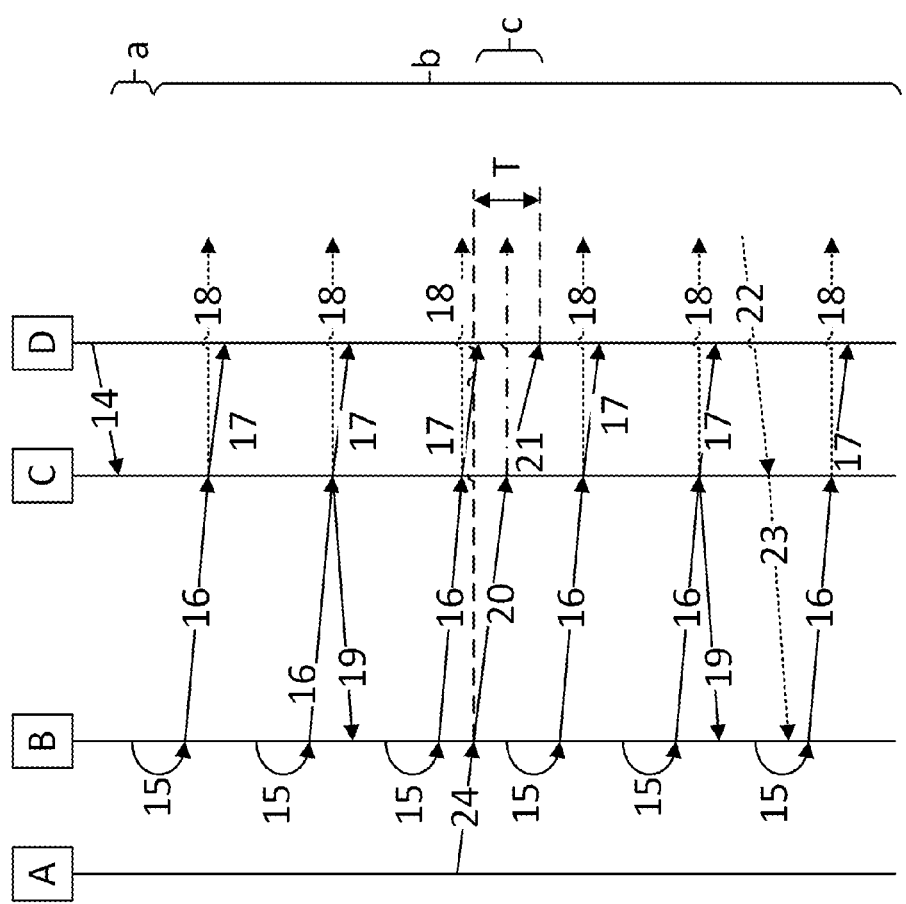
FIG. 7 is a schematic representation of the message processing in different subscribers of a wireless network.

FIG. 7 illustrates the sequence of some messages in alarm system 7. Reference character A represents a peripheral system which generates alarms. Reference character B represents the alarm gateway. Reference character C represents the alarm system on a mobile user terminal, and reference character D represents the control of the mobile user terminal. During the initialization (a), the alarm system in mobile user terminal C receives 14 data of the mobile user terminal.

After the initialization (a), the network monitoring phase (b) begins, in which alarm gateway B first generates test messages 15 and transmits 16 them to mobile alarm systems C.

Based on the received test messages, they ascertain the status of the network and report 17 it to a control of the mobile user terminal. In addition, test messages 15 are forwarded 18 to other mobile user terminals if corresponding conditions have been met. When the alarm system in mobile user terminal C generates a feedback message, it transmits 19 it to alarm gateway B. Feedback messages 22 received from other user terminals are also forwarded 23 if the current user terminal is part of the route.

If a peripheral system A generates an alarm signal 24 and transmits it to alarm gateway B, then the alarm system is able to transmit, 20, this alarm signal as an alarm message to the user terminal. The alarm message is immediately forwarded, 21, to control D of the mobile user terminal. This is referred to as an alarm transmission phase (c). If corresponding conditions have been met, the alarm messages are forwarded to other mobile user terminals, similar to the test messages. The extremely minimal deterministic delay in the alarm system relates to delay T illustrated in FIG. 7. While the alarm is propagating, the network continues to be monitored.

One exemplary sequence of the alarm system can be described in the following steps. In a first step, the alarm gateway generates a test message. In a second step, the test message is distributed inside the network with the aid of broadcast flooding. In a third step, the user terminals, such as the mobile systems evaluate the incoming test messages. The connection quality is determined, for example. In a fourth step, the user terminal generates a feedback message and transmits this feedback message in a fifth step through the network to the alarm gateway. In a sixth step, the alarm gateway receives the feedback message and evaluates it.

These six steps are described in greater detail below.

Step 1: Generation of a Test Message by the Alarm Gateway(s)

Figure 8:
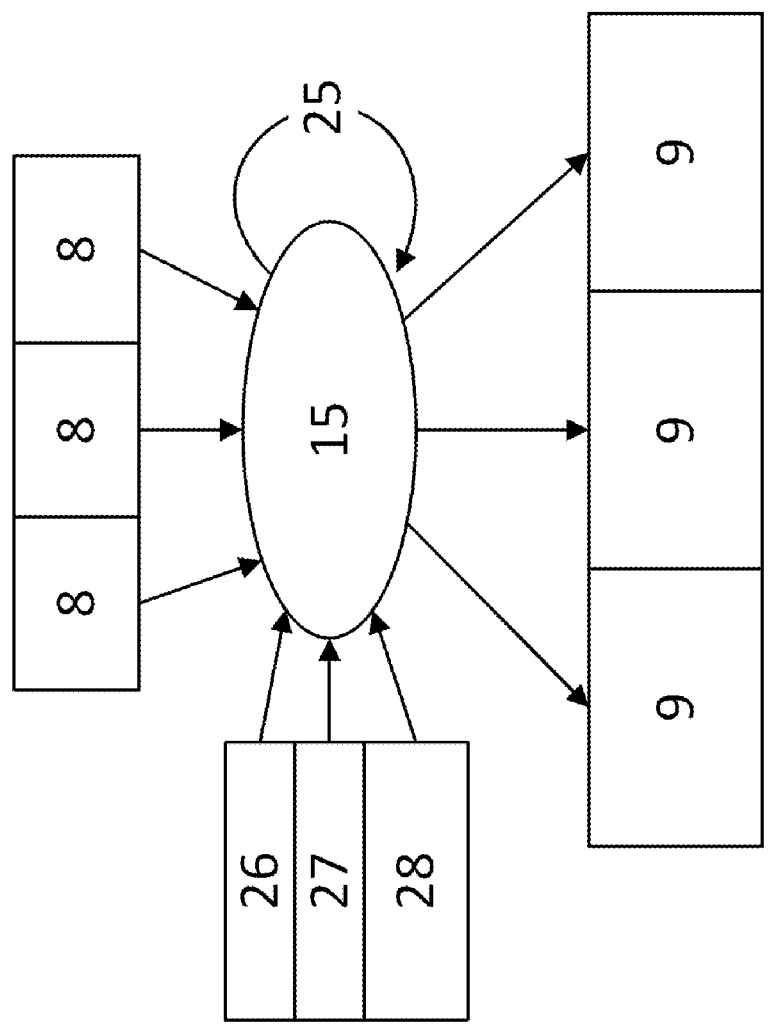
FIG. 8 is a schematic flow diagram illustrating the generation of a test message by an alarm gateway.

A sequence of the first step is illustrated in FIG. 8, for example. Using a predefined frequency 25, each alarm gateway generates, 15, test messages. The frequency is, for example, within a range of Hz to kHz but may also be below or above this range. The test message includes the following information, for example (see, FIG. 13): a unique identification that identifies the message as part of the alarm system; the unique address of the alarm gateway within the network such as an IP address; the location of the alarm gateway; status information about the alarm gateway; the time of the message transmission; an incrementing index; the message type such as a test message or an alarm message; the number of forwarding events so far; a check sum for checking the integrity of the data, and a list of user terminals that have forwarded the test message up to this point. This list is empty at the outset. Frequency 25 at which these test messages are generated 24 may be determined according to the respective application and made known to the alarm system during the initialization. A low frequency 25 barely affects the other communication in the respective transmission medium whereas a high frequency allows for the monitoring of very fast network subscribers. The generated test message is transmitted via all available communications interfaces 9. The generating of message 24, for example, incorporates information from alarm inputs 8, from a control 26, from a navigation 27, and from an energy management 28 in order to obtain the aforementioned information.

Figure 9:
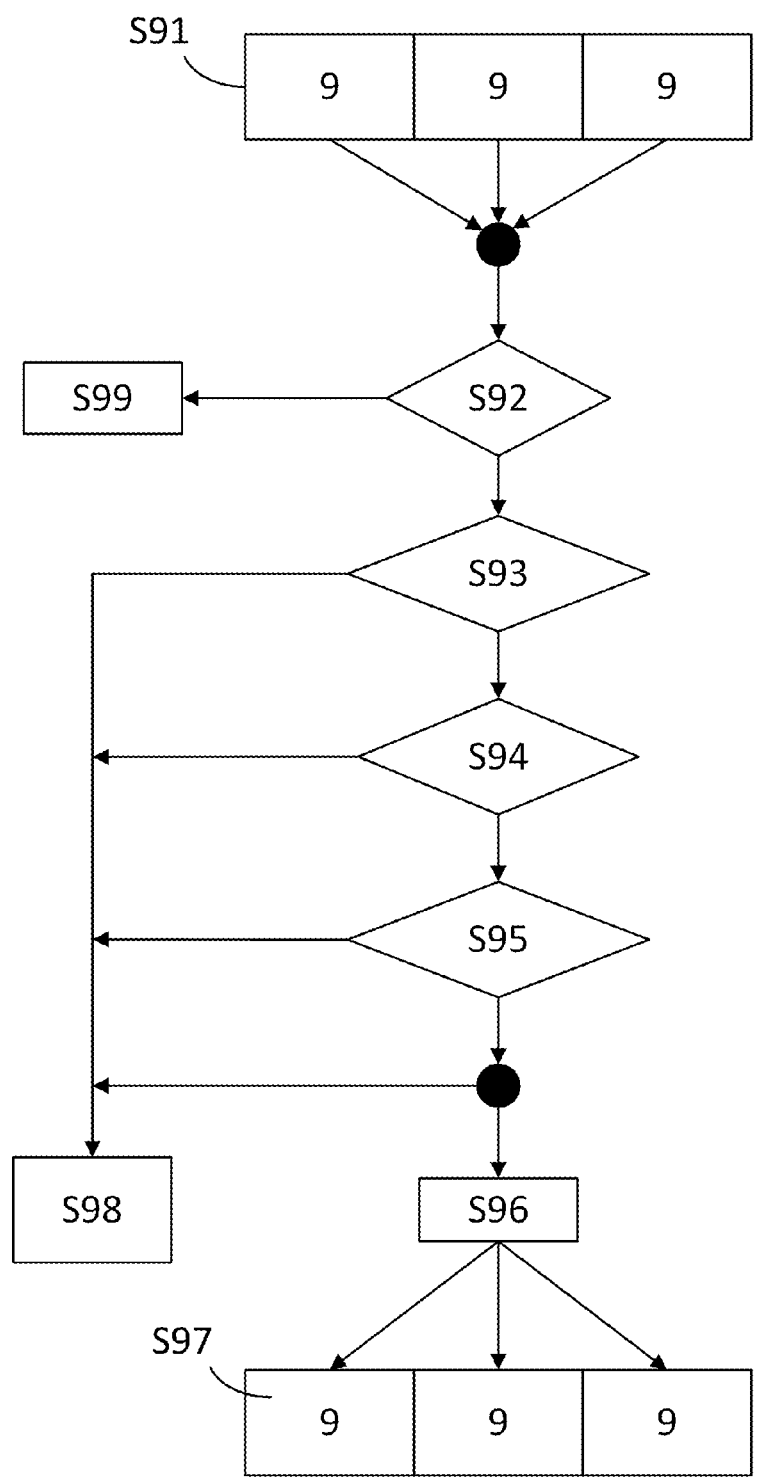
FIG. 9 is a schematic flow diagram illustrating the distribution of a test message as a broadcast in the wireless network by an alarm gateway.

Step 2: Distribution of the Test Message with the Aid of Broadcast Flooding in the Network FIG. 9 is a flow diagram of the second step according to which the test messages are distributed via broadcast in the network. When a communications interface 9 of a user terminal receives S91 a test message, then its validity and integrity are first checked S92 with the aid of the included check sum. If no valid test message is involved, the processing of the current test message is ended in step S99. However, if a valid test message is involved, it is immediately evaluated whether this message is to be forwarded. This immediate check even allows for a slight delay if a message is forwarded multiple times. Three conditions are, for example, checked in such a check:

1. The Number of Current Forwarding Events (S93):

A test message is forwarded only up to a certain maximum hop count. The maximum hop count is selected based on the available interfaces and the application.

2. Current Delay (S94):

The delay is able to be ascertained in that the transmission instant from the message is compared to the current instant because all systems are time-synchronized. A test message is no longer forwarded if it has exceeded a validity period, i.e., a maximally permissible delay. This does not affect the method of functioning of the system because even the absence of test messages makes it possible to extract the information that a user terminal is no longer reachable at a small delay.

3. Uniqueness of the Test Message (S95):

A subscriber forwards a test message maximally a single time. To this end, the subscriber checks the combination of an address of the alarm gateway and the incrementing index. In combination, these two parameters allow for an unambiguous identification of the message so that a subscriber will not forward the same message again. With the aid of this method, the flood mechanism is kept free of loops.

All of these checks serve the purpose of reducing the load via the wireless interfaces and of ensuring the operability of the alarm system. If all three conditions are met, information about the user terminal is appended S96 to the message, and the message is forwarded S97 via all available communications interfaces 9 of the mobile system. The forwarding may also be carried out via a plurality of communications interfaces 9.

In addition to this forwarding, each test message is also used for evaluating the network, S98.

Step 3: Evaluation of Incoming Test Messages by the User Terminals

According to the third step, all incoming test messages are used for evaluating the network status. A mobile subscriber, for example, has a network evaluation unit for this purpose. Even messages that are not forwarded or that are received twice or late are used for detecting the network status at the user terminal. Different metrics may be employed for the evaluation. For example, the average and/or the greatest measured delay is/are able to be ascertained. Also, a ratio of the number of received to non-received alarm messages may be calculated. This can be done individually for each communications interface or jointly as a shared parameter for all communications interfaces. The length and reliability of the routes for the transmission and/or the redundancy of the used routes may be further metrics. A connection quality and/or a network status is/are derived from one or more of these quantitative metric(s). The network evaluation unit forwards the network status derived in this manner to the control of the mobile subscriber. In addition, the network status is used for ascertaining the optimum return route to the alarm gateway. The information that each forwarding user terminal has appended to the test message is used for this purpose. In this context, it is checked which one of the routes is the most reliable route. If two routes offer the same reliability, then the shortest route will be used. A 'route' is to be understood as a series of combinations of user terminal addresses and the communications interface 9 to be used. They may be taken from the list of the forwarding systems in a test message.

Step 4: Generation of a Feedback Message by Each User Terminal

Figure 10:
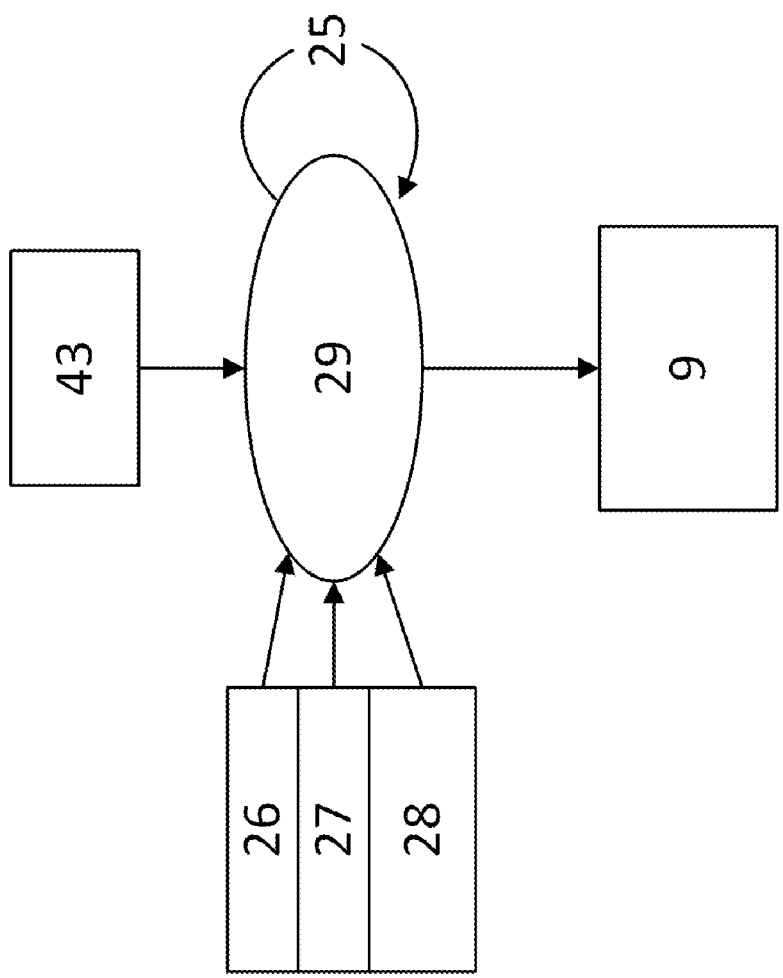
FIG. 10 is a schematic flow diagram illustrating the generation of a feedback message by a mobile system.

In a fourth step, each user terminal prepares feedback messages at a defined frequency 25 through which the alarm gateway is informed of the current status of the network. FIG. 10 illustrates a sequence of such a method for generating 29 a feedback message, for example. Frequency 25 of the feedback generation is, for example, lower than or equal to frequency 25 of the test message generation. The following information (see, FIG. 14) is, for example, stored in the feedback message: a unique ID which identifies the message as feedback; the address, the position and status 44 of the transmitter; the average and maximum delay; the number of received messages; the ratio of the number of received to non-received messages; further features such as a detected time desynchronization that characterize a network status, e.g., a redundancy, critical routes, etc.; the length 45 of the route for returning the message; the current position 46 on the return transmission route, as well as addresses 47 of the network subscribers that will forward the feedback message to the alarm gateway. The generation of message 29 incorporates information from network evaluation unit 43, a control 26, a navigation 27, and from an energy management 28.

Step 5: Transmission of the Feedback Messages to the Alarm Gateway by the Network In the fifth step, the feedback messages are returned to the alarm gateway.

The routes that are ascertained by the test messages are used so that the feedback messages are able to be returned to the alarm gateway without utilizing infrastructure. Especially a route that is the most reliable or fastest route, for example, is selected. Thus, the route includes a list of mobile systems that has been taken from the last test message received on the selected route, in reverse order. A feedback message is transmitted to the wireless network in the form of a unicast or broadcast.

Figure 11:
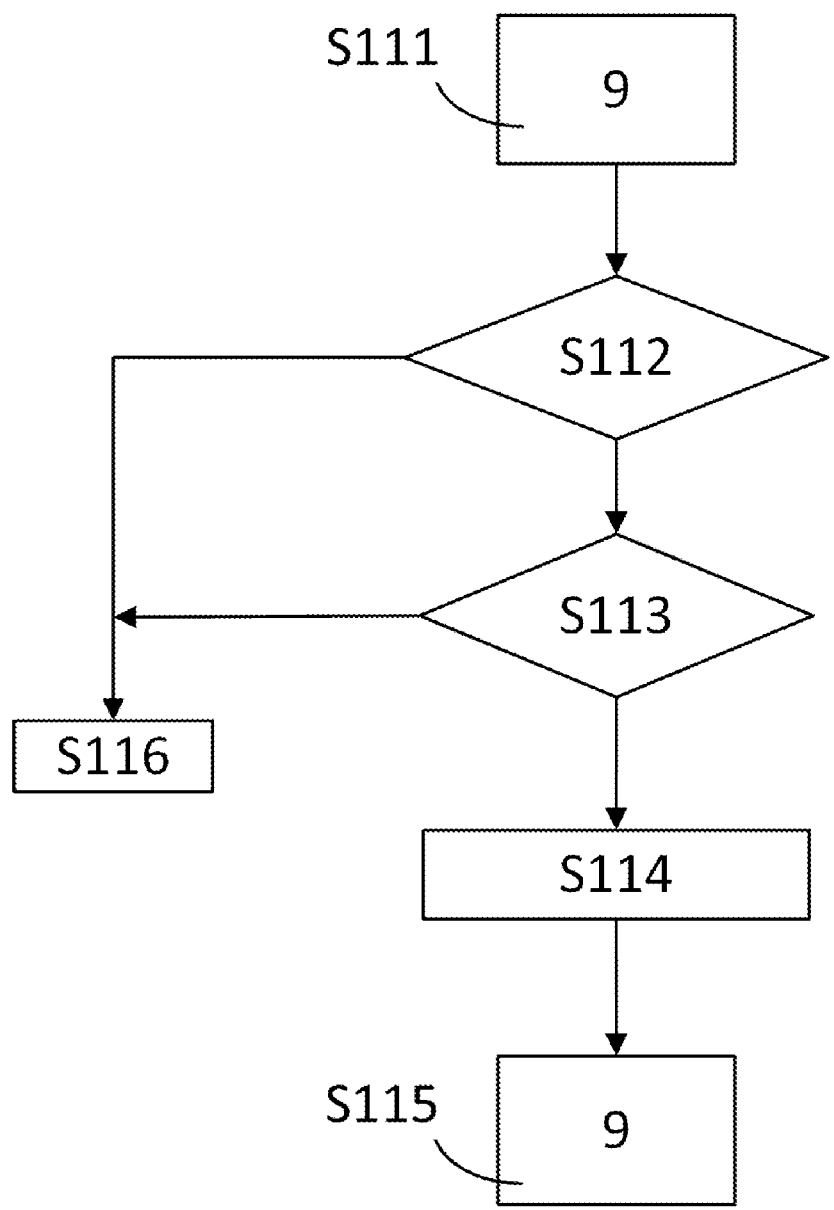
FIG. 11 is a schematic flow diagram illustrating the receipt, evaluation, and presentation of the network status at the alarm gateway.

Here, all user terminals in the alarm system function both as sources of the feedback messages and as a router or relay for forwarding the feedback messages. FIG. 11 illustrates the sequence of the method, for example. When a user terminal receives S111 a feedback message, it first checks, S112, its fault-free transmission with the aid of the check sum. Next, it is checked, S113, whether the user terminal is a component of the route that is to transmit the message, or in other words, whether the own address is included in the list of the feedback message. If this is the case, the routing information in the message is updated, S114, and the feedback message is forwarded, S115, via communications interface 9 indicated on the route.

Step 6: Receiving, Evaluating and Presenting the Network Status at the Alarm Gateway In the sixth step, the alarm gateway receives the feedback messages. The network is able to be monitored and evaluated on the basis of the received feedback messages. It is possible to determine which user terminals are no longer connected to the network or which topology the entire network exhibits. This makes it possible for the alarm gateway to react appropriately to changes in the network.

Figure 12:
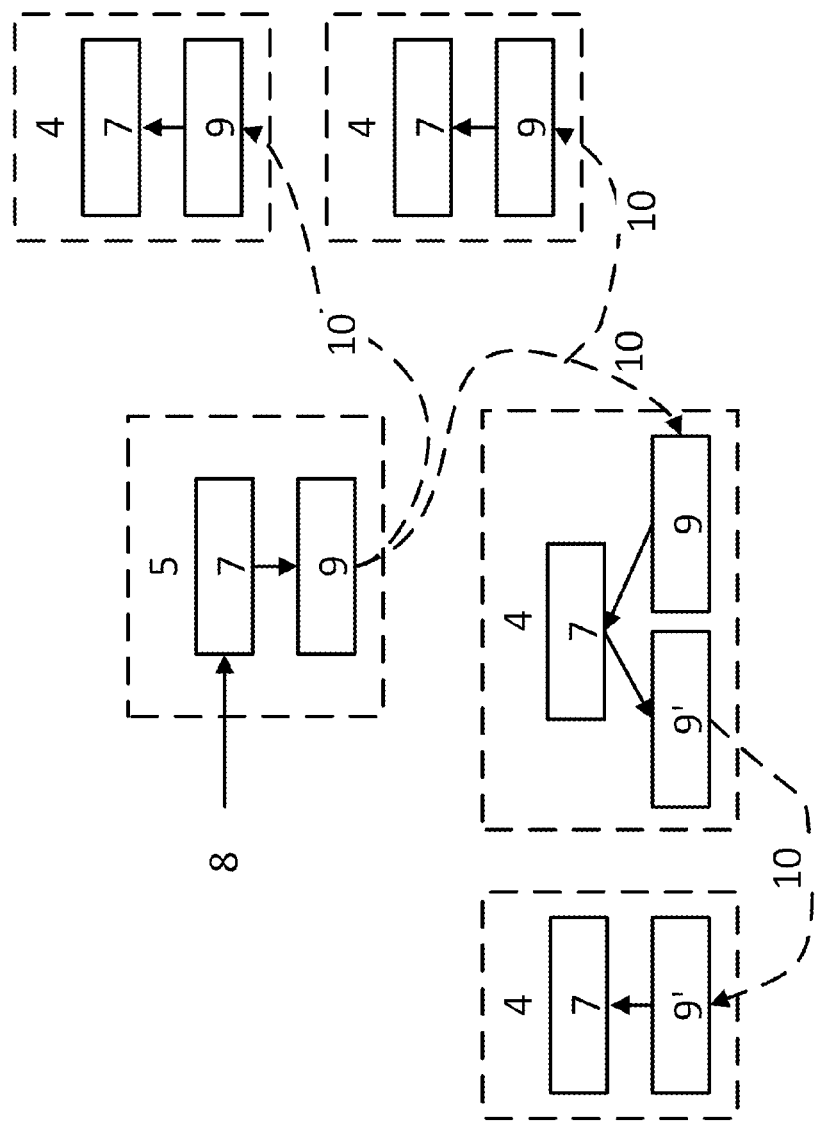
FIG. 12 schematically illustrates a wireless network having an alarm gateway according to an example embodiment of the present invention and a plurality of mobile systems.

FIG. 12 illustrates an exemplary implementation of an alarm system 7 in an operational environment. The system has a plurality of mobile systems 4 as user terminals and a stationary alarm gateway 5. FIG. 12 illustrates the path of test messages 10, the feedback messages correspondingly moving in the opposite direction. In the illustrated example, each user terminal has a single-circuit board computer provided with a WLAN 9 and a Bluetooth interface 9'.

Alarm gateway 5 sends test messages 10 with the aid of WLAN, which are forwarded by user terminals 4. The same interfaces 9 are also used for reporting the status of the user terminals back to alarm gateway 5. Messages received via WLAN, for instance, are able to be returned by user terminals 4 also via Bluetooth or vice versa, or via all available interfaces.

Since the network status for each user terminal 4 is locally known from the test messages, information about the current zone in which mobile user terminal 4 is located is required. Mobile systems 4 may localize themselves in the environment. In addition, zone information for the environment is available in mapped form or features of the environment allow for an allocation to the zones. Accordingly, the network and the zone information may be combined to generate the previously described reactive and/or preventive behaviors of the user terminals.

Figure 13:
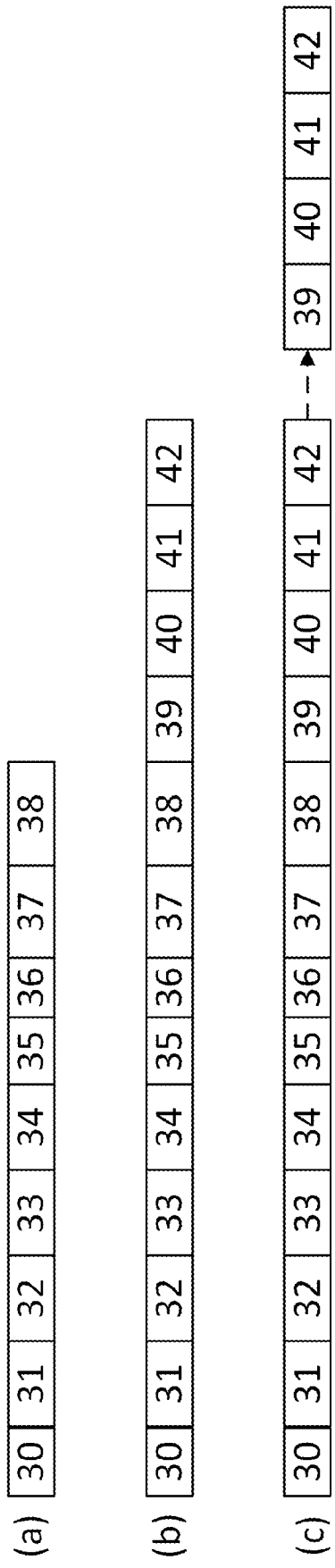
FIG. 13 schematically illustrates the information within a test message.

FIG. 13, in row (a), illustrates components of the test or alarm messages, for example. The message begins with an ID 30, which identifies the message as part of the protocol. ID 30 does not change during the propagation time. Following next are address 31 of the original transmitter, its position 32, and its status 33. This is followed by a time stamp 34 including the transmission instant and a counter 35. Each transmitter has precisely one counter 35, which increments continuously. With the aid of this counter 35 and transmitter address 31, every alarm or test message is unambiguously identified. Alarm and test messages are differentiated by type 36. For example, an alarm may have type 1, and a test message may have type 0. Further types may describe special alarms or test messages. Next, a further counter 37 indicates how often the messages have already been forwarded. A final field indicates a check sum 38 based on which the integrity of the received data is able to be verified.

Prior to each forwarding, the forwarding subscriber appends to the message its address 39, its position 40, its status 41, and the current instant 42, as illustrated in row (b) of FIG. 13. After n forwarding events, n of these subscriber information packets have therefore been appended, as illustrated in row (c) of FIG. 13. Depending on the application, different and/or more or less information may be included in the message. Thus, it should be understood that the foregoing is exemplary and not limiting.

Figure 14:
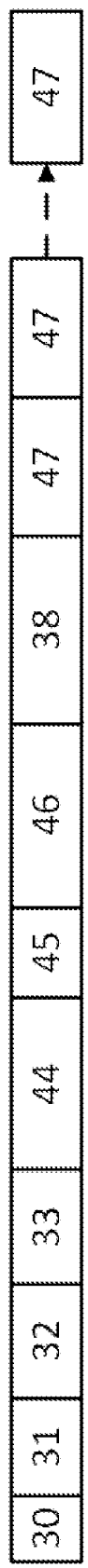
FIG. 14 schematically illustrates a the information within a feedback message.

FIG. 14 illustrates components of a feedback message, for example. The feedback message has a similar structure as a test message as illustrated in FIG. 13 and partly includes the same components; for this reason, these components have also been provided with the same reference numerals. In addition, the feedback message includes status information 44 of the mobile system, the length of attached route 45, the current position 46 of the mobile system on the route, and a list of addresses 47 of the relays on the route. In addition to a network address of the relay, address 47 also includes the interface via which the relay is to forward the feedback message. This ensures a reliable and fast transmission of the feedback message.

LIST OF REFERENCE CHARACTERS 1 obstacle
2 escape route
3 area at risk of an explosion
4 mobile system
5 alarm gateway
6 range
7 alarm system 8 alarm interface
9 communications interface
10 broadcast
11 feedback
12 feedback forwarding
13 status evaluation unit
14 initialization data
15 generation of the test message
16 transmission of the test message
17 reporting of the network status
18 forwarding of the test message
19 feedback message
20 alarm message
21 forwarded alarm message
22 further feedback message
23 forwarded feedback message
24 alarm signal
25 frequency of the test and alarm messages
26 control
27 navigation
28 energy management
29 generated feedback message
30 ID
31 transmitter address
32 transmitter position
33 transmitter status
34 transmission instant
35 counter
36 type
37 counter for the number of forwarding events
38 check sum
39 forwarder address
40 forwarder position
41 forwarder status
42 forwarding instant
43 network evaluation unit
44 status information of the mobile system
45 length of the attached route
46 current position on the route
47 address of a relay on the route
S31-S37 steps for a reactive behavior of mobile system
S41-S47 steps for a preventive behavior of a mobile system
S91-S99 steps for the processing of a test message
S111-S116 steps for transmitting a feedback message

The invention claimed is:

1. A method for operating a mobile system as a subscriber in a wireless network having a plurality of subscribers, an operational environment of the mobile system being subdivided into different zones, comprising:
  detecting a current position of the mobile system within the zones;
  determining a connection quality of the mobile system in the network; and
  adapting a behavior of the mobile system based on the determined connection quality and the detected position within the zones;
  wherein the determination of the connection quality includes receiving and evaluating test messages that are receivable as a broadcast in the network; and
  wherein at least one of the test messages includes at least one unique identification, a counter that is unalterable during a forwarding operation, and an originator time stamp.

2. The method according to claim 1, wherein the determination of the connection quality includes receiving and evaluating the test message that is receivable as a broadcast in the network.

3. The method according to claim 2, wherein the test message includes at least one unique identification, a counter that is unalterable during a forwarding operation, and an originator time stamp.

4. The method according to claim 1, wherein at least one of the test messages includes information about an originator of the test message.

5. The method according to claim 1, wherein the determination of the connection quality includes evaluating, by the mobile system, a delay, a transmission probability, and/or a sequence of the received test messages and a redundancy of routes via which the test messages are received.

6. The method according to claim 5, wherein the delay is determined based on a difference between a receipt time and an originator time stamp of the test message.

7. The method according to claim 5, wherein the determination of the connection quality includes transmitting a test message and wherein multiple conditions apply to the transmission of the test message.

8. A method for operating a mobile system as a subscriber in a wireless network having a plurality of subscribers, an operational environment of the mobile system being subdivided into different zones, comprising:
  detecting a current position of the mobile system within the zones;
  determining a connection quality of the mobile system in the network; and
  adapting a behavior of the mobile system based on the determined connection quality and the detected position within the zones;
  wherein the determination of the connection quality includes transmitting a test message;
  wherein multiple conditions apply to the transmission of the test message; and
  wherein the transmitting of the test message includes forwarding a received test message, and wherein the multiple conditions include a validity period for a test message as a condition and the test message not being forwarded if the delay is greater than the validity period.

9. A method for operating a mobile system as a subscriber in a wireless network having a plurality of subscribers, an operational environment of the mobile system being subdivided into different zones, comprising:
  detecting a current position of the mobile system within the zones;
  determining a connection quality of the mobile system in the network; and
  adapting a behavior of the mobile system based on the determined connection quality and the detected position within the zones;
  wherein the determination of the connection quality includes transmitting a test message;
  wherein multiple conditions apply to the transmission of the test message; and
  wherein prior to the transmission, a test message is supplemented with information pertaining to the mobile system and a forwarding counter of the test message is incremented.

10. The method according to claim 9, wherein the information pertaining to the mobile system includes a time stamp of a transmission time and an address of a transmitter.

11. The method according to claim 1, wherein a good connection quality corresponds to a quantitative representation of at least one network parameter exceeding a predefined connection threshold value, and/or an insufficient connection quality corresponds to a quantitative representation of at least one network parameter undershooting a predefined connection threshold value.

12. A method for operating a mobile system as a subscriber in a wireless network having a plurality of subscribers, an operational environment of the mobile system being subdivided into different zones, comprising:
    detecting a current position of the mobile system within the zones;
    determining a connection quality of the mobile system in the network; and
    adapting a behavior of the mobile system based on the determined connection quality and the detected position within the zones;
    wherein a good connection quality corresponds to a quantitative representation of at least one network parameter exceeding a predefined connection threshold value, and/or an insufficient connection quality corresponds to a quantitative representation of at least one network parameter undershooting a predefined connection threshold value; and
    wherein the adapting of the behavior includes the mobile system preventively not driving in safety-critical zones in response to the connection quality being insufficient.

13. The method according to claim 1, wherein the adapting of the behavior includes: (a) continuing a normal operation if a good connection quality is determined when the mobile system is located in a non-critical zone; (b) a current task is continued if the mobile system is located in a critical zone; (c) if an insufficient connection quality is determined, the current task is ended and a search for a network access is subsequently performed when the mobile system is located in a non-critical zone; and/or (d) if the mobile system is located in a critical zone, the critical zone is left immediately and a search for a network access is performed.

14. The method according to claim 1, further comprising transmitting a feedback message to a central alarm gateway, the feedback message including at least a status of the mobile system.

15. The method according to claim 14, wherein the feedback message is transmitted as a unicast message via a selected route, the feedback message includes a list of addresses of the mobile systems of the selected route, and the selected route is a safest, a most reliable, and/or a fastest route.

16. The method according to claim 1, further comprising:
    receiving an alarm message that is available in the network in the form of a broadcast;
    forwarding the alarm message as a broadcast to the network;
    activating an alarm state of the mobile system based on the alarm message; and
    adapting the behavior of the mobile system based on the alarm state.

17. The method according to claim 16, wherein the alarm state is revoked only by an alarm acknowledgment.

18. The method according to claim 1, wherein at least one wireless communications interface of a mobile system is used for receiving and/or transmitting messages.

19. The method according to claim 1, wherein the messages are transmitted via the wireless communications interface electromagnetically, electromagnetically via WLAN and/or Bluetooth, optically, acoustically, and/or inductively.

20. A method for operating an alarm gateway as a subscriber in a wireless network having a plurality of subscribers, comprising
    repeatedly transmitting a test message to the network as a broadcast;
    wherein the test message includes at least one unique identification, a counter that is unalterable during a forwarding operation, and an originator time stamp.

21. The method according to claim 20, wherein an alarm signal is received via an alarm interface, the alarm gateway is set into an alarm state, and the alarm gateway, in the alarm state, transmits at least one alarm message as a broadcast to the network instead of the test messages.

22. The method according to claim 20, wherein, in response to an acknowledgment of the alarm by a user, the alarm gateway is reset from the alarm state to a normal state and resumes the repeated transmission of test messages.

\* \* \* \* \*